United States Patent
Tiwari et al.

(10) Patent No.: US 9,805,053 B1
(45) Date of Patent: Oct. 31, 2017

(54) PLUGGABLE STORAGE SYSTEM FOR PARALLEL QUERY ENGINES

(71) Applicant: EMC IP Holding Company LLC, Hopkinton, MA (US)

(72) Inventors: Sameer Tiwari, Fremont, CA (US); Milind Arun Bhandarkar, San Jose, CA (US); Bhooshan Deepak Mogal, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/842,816

(22) Filed: Mar. 15, 2013

Related U.S. Application Data

(60) Provisional application No. 61/769,043, filed on Feb. 25, 2013.

(51) Int. Cl.
  *G06F 17/30* (2006.01)
  *G06F 15/16* (2006.01)

(52) U.S. Cl.
  CPC .... *G06F 17/30194* (2013.01); *G06F 17/3007* (2013.01); *G06F 17/30306* (2013.01); *G06F 17/30424* (2013.01)

(58) Field of Classification Search
  CPC ......... G06F 17/30067; G06F 17/30021; G06F 17/30091
  USPC ........ 707/802, 812, 821, 776, 661; 709/201, 709/203, 204, 213, 219
  See application file for complete search history.

(56) References Cited

U.S. PATENT DOCUMENTS

| | | |
|---|---|---|
| 5,495,607 A | 2/1996 | Pisello |
| 5,655,116 A | 8/1997 | Kirk et al. |
| 5,706,514 A | 1/1998 | Bonola |
| 6,266,682 B1 | 7/2001 | LaMarca et al. |
| 6,718,372 B1 * | 4/2004 | Bober ............... G06F 17/30203 707/E17.032 |
| 6,745,385 B1 | 6/2004 | Lupu et al. |
| 6,907,414 B1 * | 6/2005 | Parnell ............. G06F 17/30017 706/45 |
| 6,996,582 B2 | 2/2006 | Daniels et al. |
| 7,035,931 B1 * | 4/2006 | Zayas et al. .................. 709/229 |
| 7,069,421 B1 | 6/2006 | Yates, Jr. et al. |
| 7,177,823 B2 | 2/2007 | Lam |
| 7,194,513 B2 * | 3/2007 | Sharif ..................... H04L 67/06 709/204 |
| 7,254,636 B1 | 8/2007 | O'Toole, Jr. |
| 7,313,512 B1 | 12/2007 | Traut et al. |
| 7,493,311 B1 * | 2/2009 | Cutsinger ......... G06F 17/30545 |
| 7,593,938 B2 | 9/2009 | Lemar |

(Continued)

OTHER PUBLICATIONS

Liao et al., Multi-dimensional Index on Hadoop Distributed File System, 2010, Fifth IEEE International Conference on Networking, Architecture, and Storage, pp. 240-249.*

*Primary Examiner* — Frantz Coby
(74) *Attorney, Agent, or Firm* — Van Pelt, Yi & James LLP

(57) ABSTRACT

A method, article of manufacture, and apparatus for managing data. In some embodiments, this includes, receiving a query from a client, based on the received query, analyzing a catalog for location information, based on the analysis, determining a first storage system, an associated first file system and an associated first protocol, using the associated first protocol to communicate with the first storage system, and performing at least a portion of the query on the first storage system.

26 Claims, 3 Drawing Sheets

(56) References Cited

U.S. PATENT DOCUMENTS

| | | |
|---|---|---|
| 7,613,947 B1 | 11/2009 | Coatney et al. |
| 7,689,535 B2 * | 3/2010 | Bernard ............ G06F 17/30572 707/999.001 |
| 7,689,609 B2 * | 3/2010 | Lango ............... G06F 17/30067 707/679 |
| 7,702,625 B2 * | 4/2010 | Peterson ........... G06F 17/30908 707/999.004 |
| 7,716,261 B2 | 5/2010 | Black |
| 7,720,841 B2 | 5/2010 | Gu et al. |
| 7,739,316 B2 | 6/2010 | Thompson et al. |
| 7,827,201 B1 | 11/2010 | Gordon et al. |
| 7,949,693 B1 | 5/2011 | Mason et al. |
| 7,958,303 B2 * | 6/2011 | Shuster ................ G06F 3/0607 711/114 |
| 7,978,544 B2 * | 7/2011 | Bernard ............ G06F 17/30572 365/189.07 |
| 7,984,043 B1 | 7/2011 | Waas |
| 8,028,290 B2 | 9/2011 | Rymarczyk et al. |
| 8,051,113 B1 | 11/2011 | Shekar et al. |
| 8,131,739 B2 | 3/2012 | Wu et al. |
| 8,180,813 B1 | 5/2012 | Goodson et al. |
| 8,185,488 B2 | 5/2012 | Chakravarty et al. |
| 8,195,769 B2 * | 6/2012 | Miloushev ......... G06F 11/1076 709/217 |
| 8,200,723 B1 | 6/2012 | Sears |
| 8,219,681 B1 | 7/2012 | Glade et al. |
| 8,301,822 B2 * | 10/2012 | Pinto et al. .................. 710/315 |
| 8,312,037 B1 | 11/2012 | Batchavachalu et al. |
| 8,352,429 B1 * | 1/2013 | Mamidi et al. ............... 707/640 |
| 8,417,681 B1 * | 4/2013 | Miloushev ........ G06F 17/30067 707/704 |
| 8,452,821 B2 | 5/2013 | Shankar et al. |
| 8,484,259 B1 | 7/2013 | Makkar et al. |
| 8,533,183 B2 * | 9/2013 | Hokanson ................ G06F 3/061 707/719 |
| 8,577,911 B1 | 11/2013 | Stepinski et al. |
| 8,578,096 B2 | 11/2013 | Malige et al. |
| 8,595,237 B1 | 11/2013 | Chaudhary et al. |
| 8,682,853 B2 | 3/2014 | Zane et al. |
| 8,682,922 B2 | 3/2014 | Carlos Santieri de Figueiredo |
| 8,762,330 B1 | 6/2014 | Kick |
| 8,825,752 B1 | 9/2014 | Madhavan |
| 8,832,154 B1 | 9/2014 | Srinivasan et al. |
| 8,856,286 B2 | 10/2014 | Barsness |
| 8,971,916 B1 * | 3/2015 | Joyce ....................... G06F 3/067 455/41.2 |
| 9,118,697 B1 * | 8/2015 | Kishore ................ G06F 17/302 |
| 9,323,758 B1 | 4/2016 | Stacey et al. |
| 2002/0002638 A1 | 1/2002 | Obara |
| 2002/0049782 A1 * | 4/2002 | Herzenberg ...... G06F 17/30557 715/234 |
| 2002/0133810 A1 | 9/2002 | Giles et al. |
| 2002/0146035 A1 | 10/2002 | Tyndall |
| 2003/0126120 A1 | 7/2003 | Faybishenko |
| 2003/0172094 A1 | 9/2003 | Lauria et al. |
| 2003/0229637 A1 | 12/2003 | Baxter et al. |
| 2004/0054748 A1 | 3/2004 | Ackaouy et al. |
| 2004/0088282 A1 | 5/2004 | Xu et al. |
| 2004/0098415 A1 | 5/2004 | Bone et al. |
| 2004/0143571 A1 * | 7/2004 | Bjornson .......... G06F 17/30445 |
| 2005/0091287 A1 | 4/2005 | Sedlar |
| 2005/0165777 A1 * | 7/2005 | Hurst-Hiller ..... G06F 17/30545 |
| 2005/0198401 A1 | 9/2005 | Chron et al. |
| 2005/0216788 A1 | 9/2005 | Mani-Meitav et al. |
| 2006/0005188 A1 | 1/2006 | Vega et al. |
| 2006/0010433 A1 | 1/2006 | Neil |
| 2006/0037069 A1 | 2/2006 | Fisher et al. |
| 2006/0136653 A1 | 6/2006 | Traut et al. |
| 2006/0146057 A1 | 7/2006 | Blythe |
| 2006/0149793 A1 | 7/2006 | Kushwah et al. |
| 2006/0173751 A1 * | 8/2006 | Schwarze .......... G06Q 30/0603 705/26.61 |
| 2006/0248528 A1 | 11/2006 | Oney et al. |
| 2008/0059746 A1 * | 3/2008 | Fisher .................... G06F 9/5088 711/165 |
| 2008/0172281 A1 * | 7/2008 | Probst .................... G06Q 10/04 705/7.22 |
| 2008/0281802 A1 * | 11/2008 | Peterson .......... G06F 17/30908 |
| 2008/0313183 A1 | 12/2008 | Cunningham et al. |
| 2008/0320151 A1 | 12/2008 | McCanne et al. |
| 2009/0007105 A1 | 1/2009 | Fries et al. |
| 2009/0089344 A1 * | 4/2009 | Brown ............. G06F 17/30203 |
| 2009/0106255 A1 | 4/2009 | Lacapra et al. |
| 2009/0132609 A1 | 5/2009 | Barsness et al. |
| 2009/0222569 A1 | 9/2009 | Frick |
| 2009/0254916 A1 | 10/2009 | Bose et al. |
| 2009/0265400 A1 | 10/2009 | Pudipeddi et al. |
| 2009/0328225 A1 | 12/2009 | Chambers et al. |
| 2010/0036840 A1 * | 2/2010 | Pitts .................. G06F 17/30106 707/726 |
| 2010/0042655 A1 | 2/2010 | Tse et al. |
| 2010/0145917 A1 | 6/2010 | Bone et al. |
| 2010/0241673 A1 | 9/2010 | Wu et al. |
| 2010/0274772 A1 | 10/2010 | Samuels |
| 2010/0287170 A1 * | 11/2010 | Liu .................... G06F 17/30696 707/759 |
| 2011/0113052 A1 * | 5/2011 | Hornkvist ......... G06F 17/30622 707/759 |
| 2011/0137966 A1 * | 6/2011 | Srinivasan ........... H04L 67/1097 707/828 |
| 2011/0153662 A1 | 6/2011 | Stanfill et al. |
| 2011/0153697 A1 | 6/2011 | Nickolov et al. |
| 2011/0179250 A1 | 7/2011 | Matsuzawa |
| 2011/0313973 A1 | 12/2011 | Srivas et al. |
| 2012/0023145 A1 * | 1/2012 | Brannon et al. ............. 707/822 |
| 2012/0036107 A1 * | 2/2012 | Miloushev .......... G06F 11/1076 707/652 |
| 2012/0066274 A1 | 3/2012 | Stephenson |
| 2012/0089470 A1 | 4/2012 | Barnes, Jr. |
| 2012/0095952 A1 * | 4/2012 | Archambeau ........ G06K 9/6249 706/52 |
| 2012/0095992 A1 * | 4/2012 | Cutting ............. G06F 17/30023 707/722 |
| 2012/0101991 A1 | 4/2012 | Srivas |
| 2012/0166483 A1 | 6/2012 | Choudhary |
| 2012/0185913 A1 | 7/2012 | Martinez et al. |
| 2012/0278471 A1 * | 11/2012 | Labowicz ........... H04L 67/1097 709/224 |
| 2012/0310916 A1 | 12/2012 | Abadi et al. |
| 2012/0311572 A1 | 12/2012 | Falls |
| 2012/0317388 A1 | 12/2012 | Driever et al. |
| 2013/0036272 A1 | 2/2013 | Nelson |
| 2013/0166543 A1 * | 6/2013 | MacDonald ...... G06F 17/30979 707/723 |
| 2013/0185735 A1 | 7/2013 | Farrell et al. |
| 2013/0198716 A1 | 8/2013 | Huang et al. |
| 2013/0246347 A1 | 9/2013 | Sorenson et al. |
| 2013/0262443 A1 | 10/2013 | Leida |
| 2013/0275653 A1 * | 10/2013 | Ranade et al. ................ 711/103 |
| 2014/0136483 A1 * | 5/2014 | Chaudhary ............ G06F 17/301 707/639 |
| 2014/0149392 A1 * | 5/2014 | Wang ................ G06F 17/30011 707/722 |
| 2014/0188845 A1 * | 7/2014 | Ah-Soon ........... G06F 17/30566 707/722 |
| 2014/0195558 A1 | 7/2014 | Murthy |
| 2014/0337323 A1 | 11/2014 | Soep et al. |
| 2015/0120711 A1 * | 4/2015 | Liensberger ...... G06F 17/30424 707/722 |
| 2016/0150019 A1 * | 5/2016 | Klinkner .................. H04L 47/70 709/203 |

* cited by examiner

PLUGGABLE STORAGE SYSTEM FOR PARALLEL QUERY ENGINES

CROSS REFERENCE TO RELATED APPLICATIONS

This application is related to co-pending U.S. patent application Ser. No. 13/838,955 for PROCESSING A DATABASE QUERY USING A SHARED METADATA STORE, U.S. patent application Ser. No. 13/839,171 for PARALLEL PROCESSING DATABASE TREE STRUCTURE, and U.S. patent application Ser. No. 13/838,749 for PARALLEL PROCESSING DATABASE SYSTEM WITH A SHARED METADATA STORE, filed concurrently herewith, which is incorporated herein by reference for all purposes.

FIELD OF THE INVENTION

This invention relates generally to databases, and more particularly to systems and methods for managing datasets in databases.

BACKGROUND OF THE INVENTION

With the large amounts of data generated in recent years, data mining and machine learning are playing an increasingly important role in today's computing environment. For example, businesses may utilize either data mining or machine learning to predict the behavior of users. This predicted behavior may then be used by businesses to determine which plan to proceed with, or how to grow the business.

The data used in data mining and analytics is typically not stored in a uniform data storage system. Many data storage systems utilize different file systems, and those different file systems are typically not compatible with each other. Further, the data may reside in geographically diverse locations.

One conventional method to performing data analytics across different databases includes copying data from one database to a central database, and performing the data analytics on the central database. However, this results in an inefficient use of storage space, and creates issues with data consistency between the two databases.

There is a need, therefore, for an improved method, article of manufacture, and apparatus for managing data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
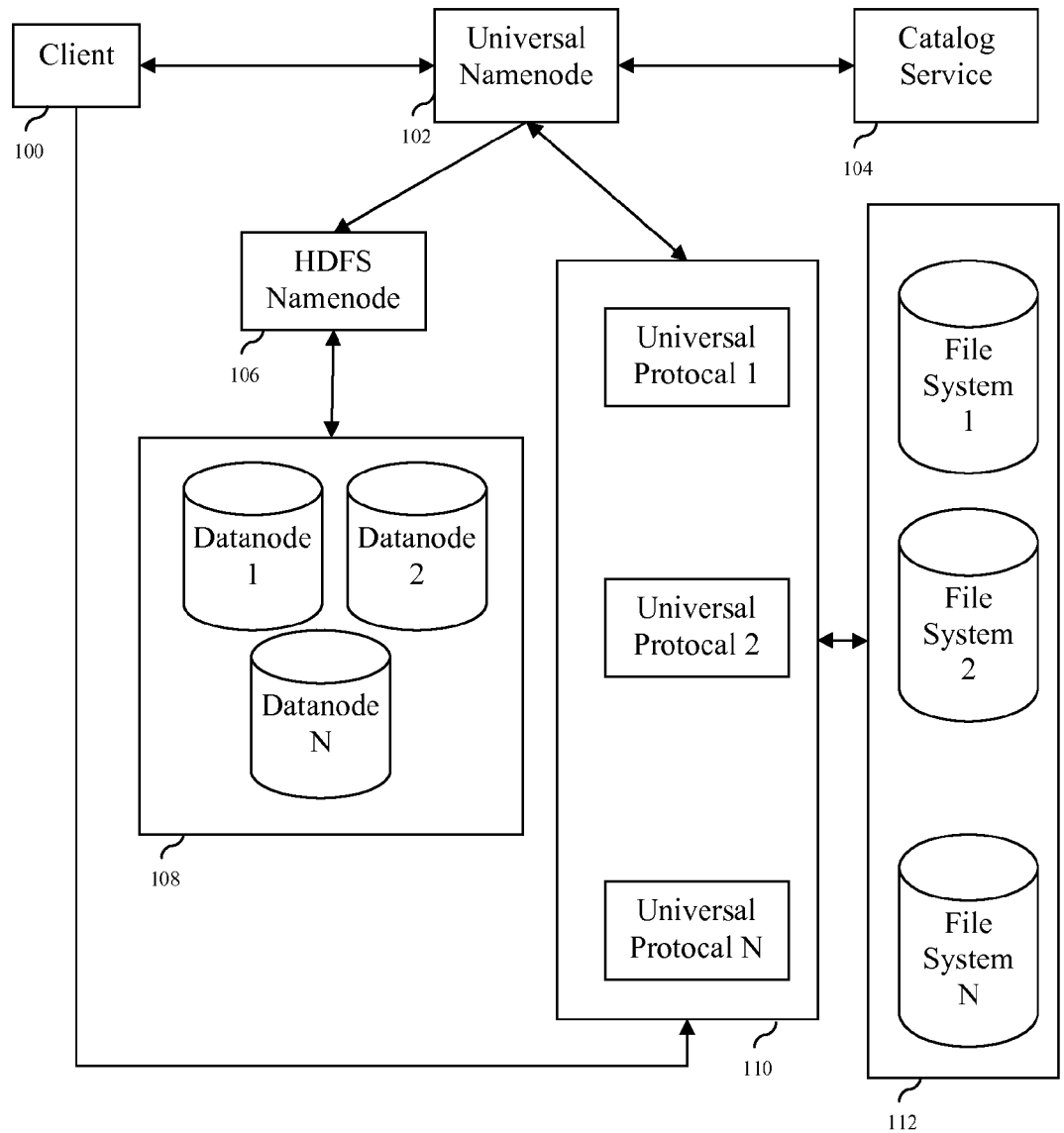
FIG. 1 illustrates a database system in accordance with some embodiments.

FIG. 1 illustrates a database system in accordance with some embodiments. Client 100 connects to Universal Namenode 102 when attempting to access data. Universal Namenode 102 access Catalog Service 104 to determine where the data is, and what type of file system the data resides in. Universal Namenode 102 may natively understand the hadoop file system (HDFS), and may readily communicate to HDFS Namenode 106. HDFS Namenode 106 is connected to Datanodes 108. Universal Namenode 102 may have several Universal Protocols 110, which allow Universal Namenode 102 to access storage systems utilizing different File Systems 112. File Systems 112 may be a diverse set of storage systems, which may utilize different file systems, such as the HDFS and NFS, among others.

Catalog 104, in some embodiments, may be a table that includes a file name and file location. For example, a simple table may include:

| File A | nfs://a/b/File A |
|--------|------------------|
| File B | hdfs://xyz/File B |

This may be stored as a text file, a spreadsheet file, or any other data object capable of storing data in tabular form.

In some embodiments, each datanode, Hadoop datanode or otherwise, also includes a data node job tracker (not shown in FIG. 1). Data node job trackers track the jobs that are run as part of a query on their specific data node. These data node job trackers report back to a universal job tracker in the Universal Namenode 102 (not shown in FIG. 1). The universal job tracker tracks the status of all jobs for a given query received from Client 100. For example, suppose a client wants to sort all word files by creation date. To the client, all the word files may look as if they were stored in one location. However, unbeknownst to the client, the word files are scattered across different storage systems. Some word files which are accessed frequently may be stored in a high speed storage system. Some word files which are rarely accessed may be stored on a slower storage system. Suppose there are three storage systems: A, B, and C. The word files reside in storage systems A and B. The universal namenode would receive the client's sort query, and then ask the catalog to determine the location of the word files. Having determined that the word files are in A and B, the universal namenode would send out the jobs to the appropriate storage systems. Storage systems A and B would each run a sort job, and each would have a job tracker to keep track of the progress of the job.

By utilizing a Universal Node 102, Client 100 has a unified view across all data sources from a single namespace. In some embodiments, this namespace may be uss://. This is also helpful if Client 100 wants to perform Hadoop jobs on data that is not stored in HDFS. Instead of copying data from a non-HDFS to a HDFS storage system and running the Hadoop job, the data can remain on their respective storage systems, and the jobs will run on the storage system. The universal protocols allow the universal namenode to connect with different file systems. In some embodiments, the universal protocol may be stored in universal namenode. Following the above example, suppose storage system A runs file system A, and storage system B runs file system B. In order to interact with both file systems, universal namenode may have a protocol plugin A for file system A, and a protocol plugin B for file system B. These two plugins allow the universal namenode to communicate with the two different file systems.

As long as the universal namenode has the correct universal protocol plugin, any type of file system may be added to the system. Following the above example, suppose a storage system D with file system D was added. As long as the universal namenode has a universal protocol plugin for file system D, the storage system D can be added and used.

Figure 2:
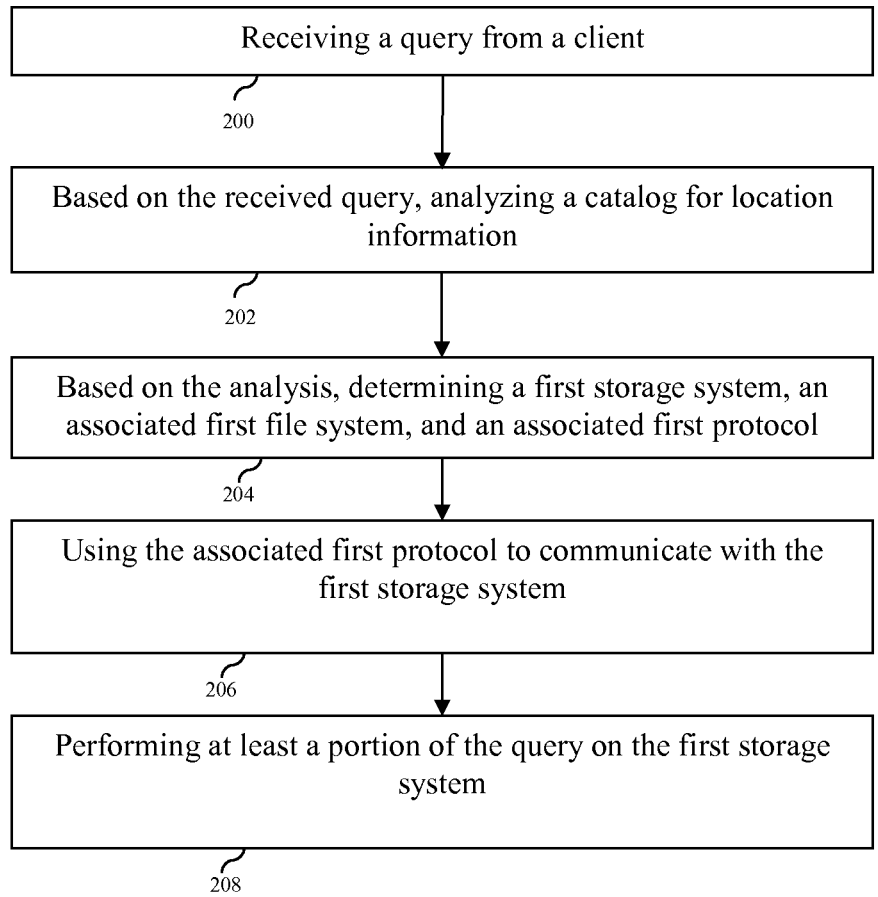
FIG. 2 is a flowchart of a method to manage data in accordance with some embodiments.

FIG. 2 is a flowchart of a method to manage data in accordance with some embodiments. In step 200, a query is received from a client. In step 202, a catalog is analyzed for location information based on the received query. In step 204, a first storage system, an associated first filing system, and an associated first protocol are determined based on the analysis. In step 206, the first protocol is used to communicate with the first storage system. In step 208, at least a portion of the query is performed on the first storage system.

Having a diverse array of storage systems allows for a system with multiple tiers of file storage. Although the client only sees one namespace (the universal namenode), many namespaces may reside under the universal namenode. These different namespaces may correspond to different types of storage systems—some with very high performance file systems, and some with low performance file systems. In some embodiments, it may be preferable to have multiple tiers of storage systems. For example, frequently accessed files may be stored on high performance file systems. Less frequently accessed files may be stored on file systems that are more optimized for storage and less for performance.

The level of activity may change for files. Frequently accessed files may be less frequently accessed, and vice versa. For example, a Q2 end report might be accessed very frequently during Q2 and Q3, but the report might not be accessed at all in Q4. In such cases, it may be preferable to move the file from one higher tier to a lower tier. With the universal namenode and catalog, moving the file from one tier to another is transparent to the client. Once the file has been moved, the catalog changes the location of the file. Previously, the location for the file may have been high_file_system://FileA. After the move, the location for the file may be low_file_system://FileA. The catalog only changes the location entry for the file. No other changes are necessary. The next time the client wants to access the file, the client will still use uss://FileA (the universal namespace), but the universal namenode will look at the catalog and determine that FileA is in the low_file_system namespace. The client does not need to keep track of which namespace the file is in.

In some embodiments, it may be preferable to copy some of the data from one storage system to another, even though the copy is not necessary to perform the query. For example, suppose storage system A and storage system B have some data that is required to run a query. Storage system A is connected via a high speed network connection and is also a high speed storage device. Storage system B is connected via a slower network connection, and is also a slower storage device. If the client wanted to perform the query as fast as possible, in may be preferable to temporarily copy some of the data on storage system B to storage system A. After the query has finished, the copied data may be removed from storage system A.

The usage of files may also be used to determine when and where to move data. For example, suppose File 1 is always accessed at 1 pm every Tuesday. Otherwise, it is never used. In some embodiments, this may constitute an inactive file, so File 1 is stored in a low performance storage system. However, File 1 may also be very large. When it is accessed at 1 pm every Tuesday, it takes a significant amount of time for the query to finish. With this statistic, it may be preferable to move File 1 to a high performance storage system at 12:30 pm every Tuesday, and move the file back to the low performance storage system after the query is complete. After the move, the catalog updates the location with the new location, and the universal namenode will now point to the new location. Similarly, after the query is complete, the catalog updates the location with the original location, and the universal namenode will now point to the original location. Since the client doesn't have to keep track of where the file is (e.g. what namespace to use), it makes no difference to the client running the query whether or not the file is moved.

Figure 3:
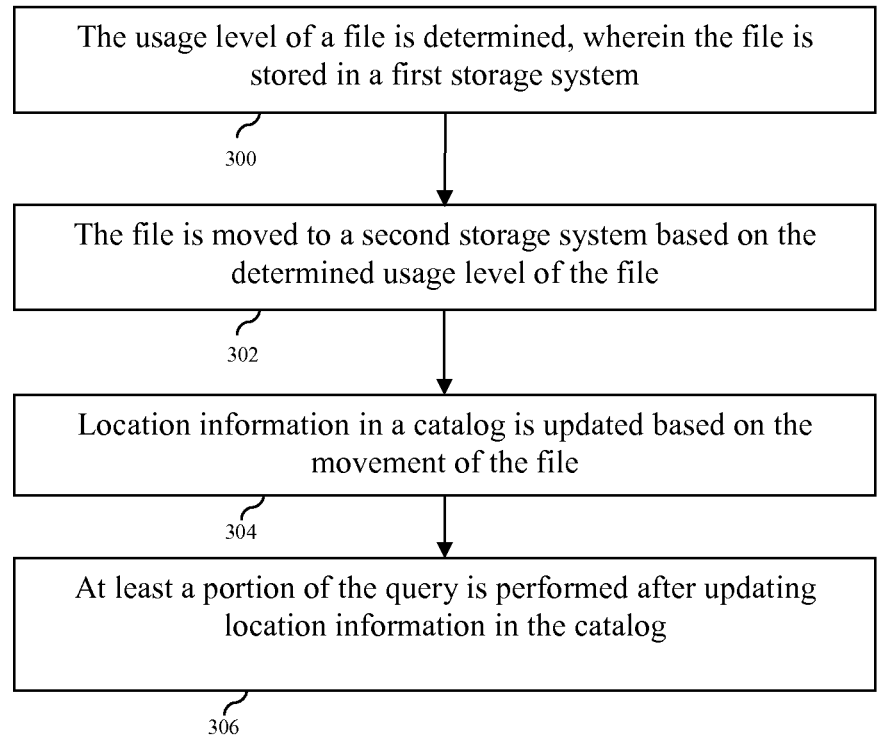
FIG. 3 is a flowchart of a method to manage data in accordance with some embodiments.

FIG. 3 is a flowchart of a method to manage data in accordance with some embodiments. In step 300, the usage level of a file is determined, wherein the file is stored in a first storage system. In step 302, the file is moved to a second storage system based on the determined usage level of the file. In step 304, location information in a catalog is updated based on the movement of the file. In step 306, at least a portion of the query is performed after updating location information in the catalog.

For the sake of clarity, the processes and methods herein have been illustrated with a specific flow, but it should be understood that other sequences may be possible and that some may be performed in parallel, without departing from the spirit of the invention. Further, though the techniques herein teach creating one SwR sample in parallel, those with ordinary skill in the art will readily appreciate that the techniques are easily extendable to generate many SwR samples. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for managing data, comprising:
   receiving, by a universal namenode, a query from a client;
   based at least in part on the received query, accessing a catalog service and searching a catalog provided by the catalog service for location information of one or more files responsive to the query, wherein the catalog stores a mapping of a plurality of files stored on a plurality of storage systems to a location at which the plurality of files are respectively stored on the corresponding plurality of storage systems, the plurality of storage systems comprising at least a first storage system and a second storage system;
   based at least in part on the search of the catalog, determining to move at least one of the plurality of files from the second storage system to the first storage system, and determining to communicate with the first storage system in connection with the one or more files responsive to the queries, and a first protocol for communication with the first storage system;
   communicating, by the universal namenode, with the first storage system using the associated first protocol;
   performing at least a portion of the query on the first storage system; and
   providing, to the client, results of the query such that in the event that various portions of the results correspond to query results stored on a set of the plurality of storage systems, the results of the query are presented in a unified view across the set of the plurality of storage systems and appear, from a perspective of the client, to exist from a single namespace.

2. The method as recited in claim 1, further comprising the first storage system reporting back the results of at least a portion of the query.

3. The method as recited in claim 1, further comprising adding a new storage system.

4. The method as recited in claim 3, further comprising determining a new protocol for communication with the new storage system.

5. The method as recited in claim 4, wherein a new file system associated with the new storage system is the same as a first file system associated with the first storage system.

6. The method as recited in claim 4, wherein a new file system associated with the new storage system is not the same as a first file system associated with the first storage system.

7. The method as recited in claim 4, further comprising updating the catalog based on data stored in the new storage system.

8. The method as recited in claim 1, further comprising determining a second storage system, and a second protocol for communication with the second storage system.

9. A system for managing data, comprising a processor configured to:
   receive a query from a client;
   based at least in part on the received query, accessing a catalog service and searching a catalog provided by the catalog service for location information of one or more files responsive to the query, wherein the catalog stores a mapping of a plurality of files stored on a plurality of storage systems to a location at which the plurality of files are respectively stored on the corresponding plurality of storage systems, the plurality of storage systems comprising at least a first storage system and a second storage system;
   based at least in part on the search of the catalog, determine to move at least one of the plurality of files from the second storage system to the first storage system, and determine to communicate with the first storage system in connection with the one or more files responsive to the queries, and a first protocol for communication with the first storage system;
   communicate with the first storage system using the associated first protocol;
   perform at least a portion of the query on the first storage system; and
   provide, to the client, results of the query such that in the event that various portions of the results correspond to query results stored on a set of the plurality of storage systems, the results of the query are presented in a unified view across the set of the plurality of storage systems and appear, from a perspective of the client, to exist from a single namespace.

10. The system as recited in claim 9, the processor further configured to add a new storage system.

11. The system as recited in claim 10, the processor further configured to determine a new protocol for communication with the new storage system.

12. The system as recited in claim 11, wherein a new file system associated with the new storage system is the same as a first file system associated with the first storage system.

13. The system as recited in claim 11, wherein a new file system associated with the new storage system is not the same as a first file system associated with the first storage system.

14. A computer program product for processing data, comprising a non-transitory computer readable medium having program instructions embodied therein for:
   receiving a query from a client;
   based at least in part on the received query, accessing a catalog service and searching a catalog provided by the catalog service for location information of one or more files responsive to the query, wherein the catalog stores a mapping of a plurality of files stored on a plurality of storage systems to a location at which the plurality of files are respectively stored on the corresponding plurality of storage systems, the plurality of storage systems comprising at least a first storage system and a second storage system;

based at least in part on the search of the catalog, determining to move at least one of the plurality of files from the second storage system to the first storage system, and determining to communicate with the first storage system in connection with the one or more files responsive to the queries, a first protocol for communication with the first storage system;

communicate with the first storage system using the associated first protocol;

performing at least a portion of the query on the first storage system; and providing, to the client, results of the query such that in the event that various portions of the results correspond to query results stored on a set of the plurality of storage systems, the results of the query are presented in a unified view across the set of the plurality of storage systems and appear, from a perspective of the client, to exist from a single namespace.

15. The computer program product as recited in claim 14, further comprising program instructions for the first storage system reporting back the results of at least a portion of the query.

16. The computer program product as recited in claim 14, further comprising program instructions for adding a new storage system.

17. The computer program product as recited in claim 16, further comprising program instructions for determining a new protocol for communication with the new storage system.

18. The computer program product as recited in claim 17, wherein a new file system associated with the new storage system is the same as a first file system associated with the first storage system.

19. The computer program product as recited in claim 17, wherein a new file system is not the same as a first file system associated with the first storage system.

20. The method of claim 11, wherein the new protocol is not the same as the first protocol.

21. The method of claim 1, wherein the first protocol for communication with the first storage system is determined, based at least in part, on a first file system associated with the first storage system.

22. The method of claim 1, further comprising:

determining whether to move a first file that is stored on the first storage system to another storage system based at least in part on a frequency with which the first file is accessed;

in the event that the first file is determined to be moved from the first storage system to the other storage system, moving the first file to the other storage system; and updating location information associated with the first file stored in the catalog to point from a location at which the first file was stored in the first storage system to a location at which the first file is stored in the other storage system, wherein, from the perspective of the client, the a location of the first file is the same in relation to the singe namespace regardless of whether the first file is moved from the first storage system to the other storage system.

23. The method of claim 22, wherein the updating of the location information comprises updating the mapping of the plurality of files stored on the plurality of storage systems to the location at which the plurality of files so as to update a record corresponding to the first file.

24. The method of claim 1, wherein the query received from the client is a query to identify one or more files stored across a distributed storage system comprising the plurality of storage systems.

25. The method of claim 1, further comprising:

tracking, by a universal job tracker of the universal namenode, a status of one or more portions of the query being respectively performed by corresponding ones of the plurality of storage systems.

26. The method of claim 1, wherein the determining to move the at least one of the plurality of files from the second storage system to the first storage system based at least in part on the search of the catalog comprises: determining to move the at least one of the plurality of files in response to the receiving the query from the client.

\* \* \* \* \*